United States Patent
Witzmann et al.

(10) Patent No.: US 11,542,195 B2
(45) Date of Patent: Jan. 3, 2023

(54) METHOD FOR MANUFACTURING A HOLLOW GLASS PRODUCT FROM A GLASS TUBE SEMI-FINISHED PRODUCT HAVING MARKINGS, AND USES OF THE SAME

(71) Applicant: SCHOTT AG, Mainz (DE)

(72) Inventors: André Witzmann, Waldershof (DE); Ulla Trinks, Mitterteich (DE); Reinhard Männl, Mitterteich (DE)

(73) Assignee: SCHOTT AG, Mainz (DE)

( * ) Notice: Subject to any disclaimer, the term of this patent is extended or adjusted under 35 U.S.C. 154(b) by 86 days.

(21) Appl. No.: 15/835,644

(22) Filed: Dec. 8, 2017

(65) Prior Publication Data
US 2018/0170804 A1 Jun. 21, 2018

(30) Foreign Application Priority Data
Dec. 19, 2016 (DE) .......................... 102016124833.9

(51) Int. Cl.
*C03C 23/00* (2006.01)
*C03B 23/04* (2006.01)
(Continued)

(52) U.S. Cl.
CPC ......... *C03C 23/0025* (2013.01); *B41M 7/009* (2013.01); *C03B 23/04* (2013.01);
(Continued)

(58) Field of Classification Search
None
See application file for complete search history.

(56) References Cited

U.S. PATENT DOCUMENTS

| 2,199,332 A | 4/1940 | Dichter |
| 2,378,146 A | 6/1945 | Luertzing |

(Continued)

FOREIGN PATENT DOCUMENTS

| CN | 102077214 | 5/2011 |
| CN | 103154973 | 6/2013 |

(Continued)

OTHER PUBLICATIONS

"Glassblowing (Wikipedia)", Internet Citation, Feb. 8, 2011 (Feb. 8, 2011), pp. 1-8, http://en.wikipedia.org/w/index.php?oldid= 412663373 [downloaded on Sep. 12, 2011].

*Primary Examiner* — Lisa L Herring
(74) *Attorney, Agent, or Firm* — Ruggiero McAllister & McMahon LLC

(57) ABSTRACT

A glass tube semi-finished product or a hollow glass product manufactured from the glass tube semi-finished product is provided with a first marking with information on the origin and/or tube-specific production data of the glass tube semi-finished product, which marking is read from the hollow glass product after its manufacture to determine the origin and/or the tube-specific production data of the glass tube semi-finished product, e.g., to identify the semi-finished glass tube from which the hollow glass product has been made, and/or trace the tube-specific production data of this glass tube semi-finished product. This means that the entire supply chain for the hollow glass product from the supplier of the originally used glass tube semi-finished product up to the end product can be determined. The physical and chemical characteristics of the glass tube semi-finished product are not altered for producing the first marking.

16 Claims, 9 Drawing Sheets manufacture of glass tube semi-finished product maanufacture of hollow glass product

(51) Int. Cl.
  *G06V 20/80* (2022.01)
  *B41M 7/00* (2006.01)
  *G06K 19/06* (2006.01)
  *B41M 5/26* (2006.01)

(52) U.S. Cl.
  CPC ...... *C03C 23/007* (2013.01); *G06K 19/06046* (2013.01); *G06V 20/80* (2022.01); *B41M 5/262* (2013.01)

(56) References Cited

U.S. PATENT DOCUMENTS

| | | |
|---|---|---|
| 2,595,077 A | 4/1952 | Hughes |
| 2,790,994 A | 5/1957 | Jean |
| 2,935,819 A | 5/1960 | Dichter |
| 3,215,517 A | 11/1965 | Zimmermann |
| 3,368,588 A | 2/1968 | Meyer |
| 3,394,263 A | 7/1968 | Baker |
| 3,401,028 A | 9/1968 | Morrill, Jr. |
| 3,462,255 A | 8/1969 | Couquelet |
| 3,549,524 A | 12/1970 | Haller |
| 3,565,536 A | 2/1971 | Wuellner et al. |
| 3,777,171 A | 12/1973 | Hollenbeck |
| 3,880,637 A | 4/1975 | Dichter |
| 4,044,936 A | 8/1977 | Obersby |
| 4,052,184 A | 10/1977 | Anderson |
| 4,136,779 A | 1/1979 | Bieringer |
| 4,378,494 A | 3/1983 | Miller |
| 4,378,989 A | 4/1983 | La Fiandra |
| 4,483,615 A | 11/1984 | Bieringer et al. |
| 4,487,322 A | 12/1984 | Juvinall |
| 4,720,192 A | 1/1988 | Willison |
| 4,731,254 A | 3/1988 | Heineken |
| 4,748,307 A | 5/1988 | Lamb |
| 5,252,115 A | 10/1993 | Mannl |
| 5,331,174 A | 7/1994 | Dassler et al. |
| 5,611,834 A | 3/1997 | Walter |
| 5,779,753 A | 7/1998 | Vetter |
| 6,211,952 B1 | 4/2001 | Weiland et al. |
| 6,415,631 B1 | 7/2002 | Weston |
| 6,595,029 B1 | 7/2003 | Dick |
| 6,633,377 B1 | 10/2003 | Weiss et al. |
| 6,638,440 B1 | 10/2003 | Grimard |
| 6,674,043 B2 | 1/2004 | Trinks |
| 8,003,915 B2 | 8/2011 | Agmon |
| 8,196,807 B2 | 6/2012 | Grimard |
| 8,328,082 B1 | 12/2012 | Bochenko |
| 8,522,575 B2 | 9/2013 | Wada |
| 8,872,870 B2 | 10/2014 | Witzmann |
| 9,378,445 B2 | 6/2016 | Stuck et al. |
| 9,514,131 B1 | 12/2016 | Bochenko |
| 9,524,623 B2 | 12/2016 | Vogel |
| 9,701,564 B2 | 7/2017 | Bookbinder et al. |
| 9,844,951 B2 | 12/2017 | Krief |
| 10,327,987 B1 | 6/2019 | Bochenko et al. |
| 10,442,718 B2 | 10/2019 | Maennl |
| 10,550,027 B2 | 2/2020 | Inoue |
| 10,710,921 B2 | 7/2020 | Wada |
| 10,899,659 B2 | 1/2021 | Demartino |
| 11,028,002 B2 | 6/2021 | Frost |
| 2003/0029849 A1 | 2/2003 | Trinks |
| 2004/0129026 A1 | 7/2004 | Bartsch |
| 2004/0239038 A1 | 12/2004 | Kramp |
| 2005/0023337 A1 | 2/2005 | Benischke |
| 2005/0218126 A1 | 10/2005 | Leyvraz |
| 2006/0108346 A1 | 5/2006 | Janhunen |
| 2006/0112729 A1* | 6/2006 | Sakoske .......... B41M 1/12 65/106 |
| 2006/0218972 A1 | 10/2006 | Brik |
| 2006/0267250 A1 | 11/2006 | Gerretz et al. |
| 2009/0077805 A1 | 3/2009 | Bachrach |
| 2009/0095803 A1 | 4/2009 | Benischke |
| 2009/0099000 A1 | 4/2009 | Kuwabara |
| 2009/0120253 A1 | 5/2009 | Benischke |
| 2009/0159174 A1 | 6/2009 | Grimard |
| 2009/0159654 A1 | 6/2009 | Grimard |
| 2010/0089097 A1 | 4/2010 | Brack et al. |
| 2010/0255229 A1 | 10/2010 | Wada |
| 2010/0319400 A1* | 12/2010 | Geisei .......... C03B 9/41 65/29.12 |
| 2011/0119898 A1 | 5/2011 | Blanchet |
| 2011/0218661 A1 | 9/2011 | Achterkamp et al. |
| 2012/0060558 A1 | 3/2012 | Haselhorst |
| 2012/0098959 A1 | 4/2012 | Addington |
| 2013/0169732 A1 | 7/2013 | Witzmann |
| 2014/0034544 A1 | 2/2014 | Chang |
| 2014/0358270 A1* | 12/2014 | Sudo .......... C03B 19/095 700/98 |
| 2014/0373574 A1 | 12/2014 | Moseler |
| 2015/0064779 A1 | 3/2015 | Schultz et al. |
| 2015/0114043 A1* | 4/2015 | Risch .......... C03B 23/043 65/29.18 |
| 2015/0197443 A1 | 7/2015 | Voelkl |
| 2015/0235233 A1 | 8/2015 | Dangmann et al. |
| 2015/0329232 A1 | 11/2015 | Brozell |
| 2016/0016841 A1 | 1/2016 | Frost et al. |
| 2016/0046517 A1 | 2/2016 | Kass |
| 2016/0074865 A1* | 3/2016 | Rao .......... B01L 3/5453 138/104 |
| 2016/0130170 A1 | 5/2016 | Maennl |
| 2016/0139062 A1 | 5/2016 | Faraldi et al. |
| 2016/0257593 A1 | 9/2016 | Nguyen |
| 2016/0272527 A1 | 9/2016 | Moseler |
| 2017/0084050 A1 | 3/2017 | Ma et al. |
| 2017/0349474 A1* | 12/2017 | Allen .......... C03B 23/07 |
| 2018/0162765 A1 | 6/2018 | Witzmann et al. |
| 2018/0164226 A1* | 6/2018 | Witzmann .......... B65C 3/02 |
| 2018/0166928 A1 | 6/2018 | Witzmann et al. |
| 2018/0170804 A1 | 6/2018 | Witzmann et al. |
| 2018/0237330 A1 | 8/2018 | Shinada |
| 2018/0346368 A1 | 12/2018 | Lisman |
| 2019/0164269 A1 | 5/2019 | Kläger et al. |
| 2020/0002212 A1 | 1/2020 | Maennl |
| 2020/0083080 A1 | 3/2020 | Clark |
| 2020/0309725 A1 | 10/2020 | Madhiwala |
| 2020/0405438 A1 | 12/2020 | Shelton |
| 2021/0098016 A1 | 4/2021 | Suzuki |

FOREIGN PATENT DOCUMENTS

| | | |
|---|---|---|
| CN | 105271655 | 1/2016 |
| DE | 3121138 | 3/1982 |
| DE | 4224282 | 1/1994 |
| DE | 19926878 | 12/1999 |
| DE | 10122335 | 7/2002 |
| DE | 10234002 | 2/2004 |
| DE | 10335247 | 2/2005 |
| EP | 0761377 | 6/1999 |
| EP | 2818454 | 12/2014 |
| GB | 2078621 | 1/1982 |
| JP | H04231333 | 8/1992 |
| JP | H06263465 | 9/1994 |
| JP | 2009132572 | 6/2009 |
| JP | 2011070214 | 4/2011 |
| JP | 2015535794 | 5/2011 |
| JP | 2016528144 | 9/2016 |
| WO | 9910238 | 3/1999 |
| WO | 2004000749 | 12/2003 |
| WO | 2008104688 | 9/2008 |
| WO | 2009116300 | 9/2009 |
| WO | 2009128893 | 10/2009 |
| WO | 2012028611 | 3/2012 |
| WO | 2012046136 | 4/2012 |

\* cited by examiner

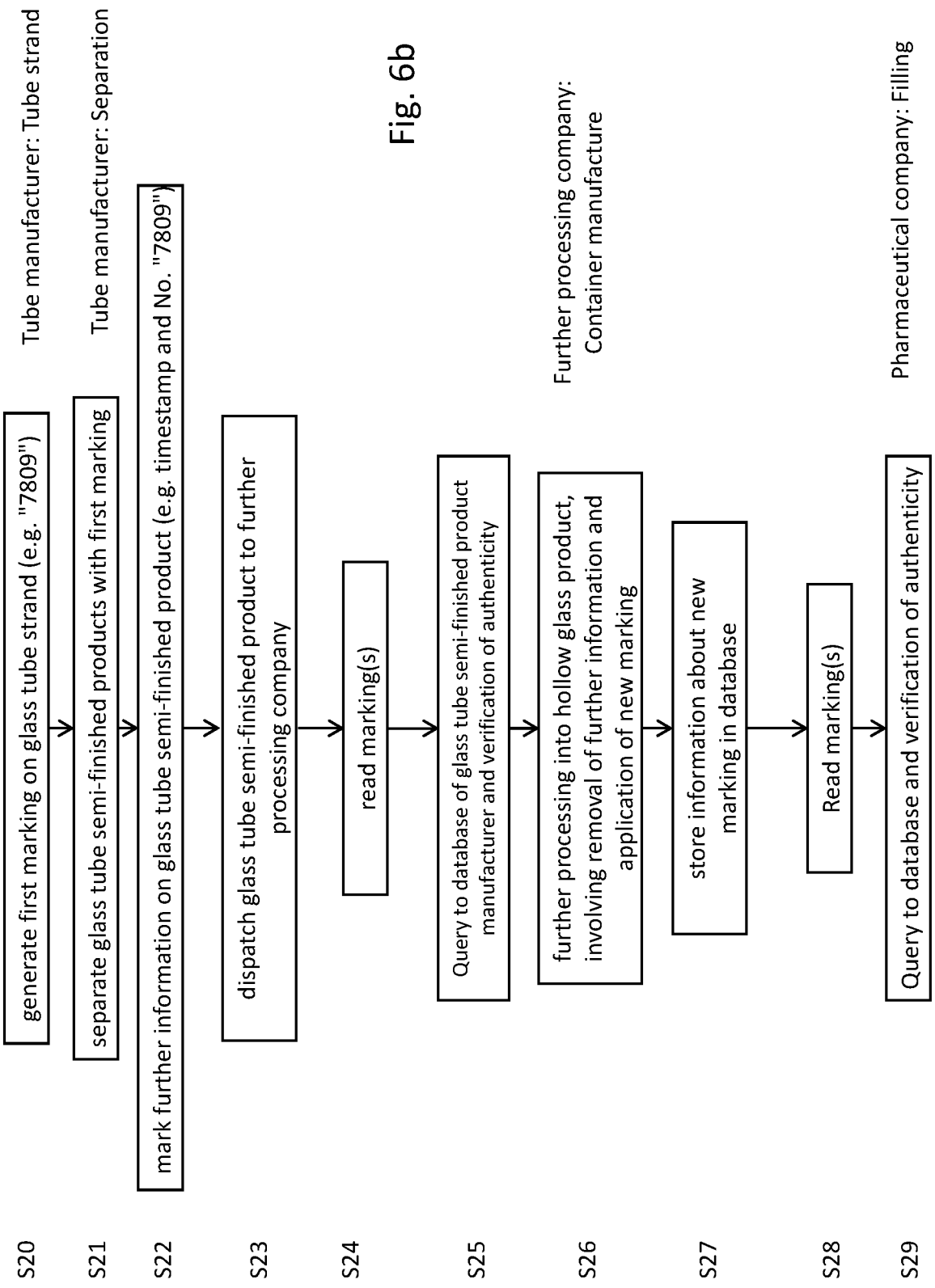

METHOD FOR MANUFACTURING A HOLLOW GLASS PRODUCT FROM A GLASS TUBE SEMI-FINISHED PRODUCT HAVING MARKINGS, AND USES OF THE SAME

CROSS-REFERENCE TO RELATED APPLICATIONS

The present application claims priority to German patent application no. 10 2016 124 833.9 "Method for manufacturing a hollow glass product from a glass tube semi-finished product having markings, and uses of the same" filed on Dec. 19, 2017, the whole content of which is hereby incorporated by reference.

FIELD OF THE INVENTION

The present invention relates generally to manufacturing and backtracking of hollow glass products made from glass manufactured of glass tube semi-finished products, in particular containers for substances for pharmaceutical, medical or cosmetic applications, such as vials, cartridges or syringe bodies, for example, and uses thereof. In particular, the present invention relates to an improved method for manufacturing a hollow glass product from a glass tube semi-finished product having at least one marking, with which a better and also reliable backtracking can be accomplished in a simple manner, for example for the purposes of quality control or quality improvement.

BACKGROUND OF THE INVENTION

Various methods for marking and coding semi-finished or finished products are known from the prior art. However, because of the particular material characteristics and manufacturing conditions of glass, the methods usually used for marking or coding glass involve imprinting markings or the like directly into the glass material.

For example, such a method is disclosed in US 2003 0029849 A1, DE 102 34 002 A1 or WO 2012 028611 A1 of the applicant, the content of which is expressly incorporated herewith by way of reference. In this method the glass is acted upon by a laser pulse in sections to apply a marking to the surface. The marking is clearly visible and in particular can be reliably read by means of a lensing effect exerted by the marking, can be stresslessly applied at high temperatures during manufacture and is therefore suitable for applying the marking during the manufacture of glass tube semi-finished products, that is to say during the tube forming process itself. As the marking can be applied at temperatures above the transformation temperature of the glass, markings for combating product piracy can be applied. Such markings but also used to apply brand names, company logos or other product features on the strand of glass tubing. However, the process can be too costly for applications that require less authenticity.

Further methods for marking glass substrates are disclosed in WO 2004 000749 A1 and WO 2009 128893 A1.

WO 2008 104688 A1 discloses a hollow glass product with a marking formed on it containing details about the production line and place of manufacture, achieved by means of a special numeric coding.

In order to mark or describe glass by means of laser radiation, other processes are known from the prior art that modify the glass by means of additives, coatings, pigments or additional doping and have a detrimental effect on its transparency at least at the position where it is processed with a laser, such as in EP 761377 B1, DE 4224282 A1, DE 3121138 C2, DE 19926878 A1 and U.S. Pat. No. 6,638,440 B1, for example.

U.S. Pat. No. 8,196,807 B2 discloses the marking of a pharmaceutical container. It is not possible to trace back to the original product glass tube.

In addition to effective protection against counterfeiting, increased product safety is playing an increasingly important role. Particularly for pharmaceutical containers, which increasingly have to comply with higher specifications, an improved information situation regarding origin, concrete production conditions etc. in the manufacture of glass tube semi-finished products and in the manufacture of hollow glass products from glass tube semi-finished products is therefore increasingly desired.

BRIEF SUMMARY OF THE INVENTION

Accordingly, there exists a need to make further improvements in this area. Notably, there exists the need to provide an improved method for manufacturing a hollow glass product from a glass tube semi-finished product and uses of the same, with which a better product safety can be achieved in a simple manner, for example for the purposes of quality control or quality improvement.

According to a first aspect of the present invention, there is provided a method for the manufacturing of a hollow glass product from a glass tube semi-finished product, in particular for the manufacturing of containers for substances for pharmaceutical, medical or cosmetic applications, such as vials, cartridges or syringe bodies, comprising the steps of: providing the glass tube semi-finished product having a first marking, wherein the first marking is applied without altering the physical or chemical characteristics of the glass tube semi-finished product; further processing of the glass tube semi-finished product and thermal forming of the glass tube semi-finished product, which is performed at least in sections, into the hollow glass product at temperatures above the transformation temperature of the glass tube semi-finished product; wherein the first marking remains unaltered during further processing of the glass tube semi-finished product and thermal forming of the glass tube semi-finished product, performed at least in sections, into the hollow glass product, and wherein the first marking comprises information on an origin and/or tube-specific production data of the glass tube semi-finished product and can be read out on the hollow glass product after its manufacture in order to enable a decision to be made on the origin and/or the tube-specific production data of the glass tube semi-finished product.

By reading out the marking, according to the invention it is thus possible to clearly identify the glass tube semi-finished product from which the hollow glass product is made. In addition, tube-specific production data of this glass tube semi-finished product can also be determined and traced directly. This means that the entire supply chain for the hollow glass product can be clearly determined from the supplier of the originally used glass tube semi-finished product up to the end product. For quality assurance purposes and the like, the respective tube-specific production data can also be determined. According to the invention, the physical and chemical characteristics of the glass tube semi-finished product are not altered, which can be achieved by simply applying a marking using a printer, such as an inkjet printer, or using a laser. This means that according to the present invention an assignment of the data, such as for example when using certificates or the like for pallets or packaging units of glass tube semi-finished products, cannot be lost, since the assignment is fixed for direct coding. This is because certificates for pallets or packaging units do not permit the tube-specific transfer of relevant quality and production data.

The fact that the physical and chemical characteristics of the glass tube semi-finished product are not altered when the marking is applied should mean in the context of the present application that the physical and chemical characteristics of the inner surface of the glass tube semi-finished product shall remain unaltered, i.e. the inner surface is not affected by a change in its physical and chemical properties, particularly against the leaching of ions into the interior of a hollow glass product to be produced from the glass tube semi-finished product.

Parameters or data sets can be used to determine the origin of the glass tube semi-finished product, such as numerical codes that encode a glass tube manufacturer, a serial number, batch number, draw number, date of manufacture, etc. generated by the manufacturer of the glass tube. For the purpose of this invention, these parameters may be supplemented by additional information representing a complete family tree of the glass tube semi-finished product used in the manufacturing of the hollow glass product.

According to another independent aspect of the present invention, which constitutes an independent alternative to the above method, there is provided a method for manufacturing a hollow glass product from a glass tube semi-finished product, comprising the steps of: providing the glass tube semi-finished product having a first marking, wherein the first marking is applied without altering the physical or chemical characteristics of the glass tube semi-finished product; further processing of the glass tube semi-finished product and thermal forming of the glass tube semi-finished product, which is performed at least in sections, into the hollow glass product at temperatures above the transformation temperature of the glass tube semi-finished product; wherein the first marking includes information about an origin and/or tube-specific production data of the glass tube semi-finished product, and wherein the first marking is removed during further processing of the glass tube semi-finished product and the thermal forming of the glass tube semi-finished product, performed at least in sections, into the hollow glass tube product, and wherein an additional marking is generated on the hollow glass product, which includes the information of the first marking about the origin and/or the tube-specific production data of the glass tube semi-finished product, and wherein the additional marking can be read out on the manufactured hollow glass product subsequent to its manufacture in order to enable a decision to be made about the origin and/or production data of the glass tube semi-finished product used for the manufacturing of the hollow glass product.

This method is particularly suitable if the process conditions during further processing of the glass tube semi-finished product into the hollow glass product do not permit maintaining the integrity of the first marking with the relevant information, for example, because the relevant section on which the first marking is provided is deformed or processed in such a way that it is no longer possible to read the first marking. Instead, this information is read out at an appropriate point in time during further processing, e. g. before starting the further processing, and a new or different marking is applied to the hollow glass product at an appropriate point in time, for which purpose generally any marking method can be used, in particular those marking methods in which the physical and chemical characteristics of the glass tube semi-finished product are not changed, e. g. by applying a marking using a printer (e.g. bar code) or by means of a printer. In principle, however, such methods are also suitable as marking methods which alter the physical or chemical characteristics of the glass of the hollow glass product, including those methods using laser marking according to US 2003 0029849 A1, DE 102 34 002 A1 and WO 2012 028611 A1 of the applicant, the contents of which are hereby expressly incorporated by reference. The fact that the physical and chemical characteristics of the glass tube semi-finished product are not altered when the marking is applied should mean in the context of the present application that the physical and chemical characteristics of the inner surface of the glass tube semi-finished product shall remain unaltered, i.e. the inner surface is not affected by a change in its physical and chemical properties, particularly against the leaching of ions into the interior of a hollow glass product to be produced from the glass tube semi-finished product.

According to a further embodiment, the first marking is generated continuously or discontinuously during forming of the tube at predetermined intervals along the longitudinal direction of the glass tube semi-finished product. In particular, these intervals can be matched to the subsequent process steps to be performed for further processing the glass tube semi-finished product. If it is known, for example, that individual segments of a predetermined length are separated from the glass tube semi-finished product later to be further processed into a hollow glass product, the first markings can be applied at this predetermined distance to each other, in order to ensure that subsequently a first marking is applied to each hollow glass product.

According to a further embodiment, the first marking or the additional marking is generated as a single marking at a predetermined position on the glass tube semi-finished product. This first or additional marking may be separated and replaced by a new marking, or supplemented by an additional marking, particularly at a further processing plant. Because this information is provided at a predetermined position, it can be read out reliably in a simple and an automated manner, because the marking does not have to be searched for on the surface of the hollow glass product.

According to a further embodiment, the additional marking is generated at temperatures above a transformation temperature ($T_G$) of the glass of the glass tube semi-finished product. A high level of anti-counterfeit protection is thus guaranteed in a simple manner, since often reheating of hollow glass products to temperatures above the transformation temperature ($T_G$) of the glass is not possible for technical reasons, for example if the hollow glass product is already filled with a substance, or if the hollow glass product was manufactured with such a high degree of precision that it is no longer possible to meet the tolerances after reheating to temperatures above the transformation temperature ($T_G$) of the glass.

According to a further embodiment, the second marking is generated during separation of the glass tube semi-finished product from a continuous strand of glass tubing. Since this separation can only be done by the original manufacturer, this therefore guarantees also a high level of anti-counterfeit protection.

A further aspect of the present invention relates to a hollow glass product made of glass, in particular a container for receiving substances for pharmaceutical, medical or cosmetic applications, produced by further processing of a glass tube semi-finished product as disclosed above, including a thermal forming of the glass tube semi-finished product, which is carried out at least in sections, for example at only one end region of the glass tube semi-finished product.

A further aspect of the present invention relates to a method of tracing a hollow glass product which is manufactured by further processing a glass tube semi-finished product including a thermal forming of the glass tube semi-finished product into the hollow glass product performed at least in sections, comprising the steps of: reading out information from a marking provided on the hollow glass product; determining the origin and/or the tube-specific production data of the glass tube semi-finished product, on the basis of the information read out of the marking.

A further aspect of the present invention relates to a corresponding device for tracing a glass tube semi-finished product or a hollow glass product, which is manufactured by further processing of a glass tube semi-finished product including a thermal forming of the glass tube semi-finished product into the hollow glass product performed at least in section, wherein the device is configured to carry out the aforementioned method as disclosed hereinafter.

A further aspect of the present invention relates to a corresponding computer program product for carrying out the aforementioned method.

BRIEF DESCRIPTION OF THE DRAWINGS

The invention will be described in the following in an exemplary manner and with reference to the appended drawings, from which will ensue further features, advantages and objects to be achieved. The figures show:

FIG. 6b a schematic flow diagram of the various stages of further processing of a glass tube semi-finished product into a pharmaceutical packaging and its further processing.

Identical reference numerals in the Figures indicate identical elements or groups of elements or those with substantially the same effect.

DETAILED DESCRIPTION OF THE INVENTION

Figure 1A:
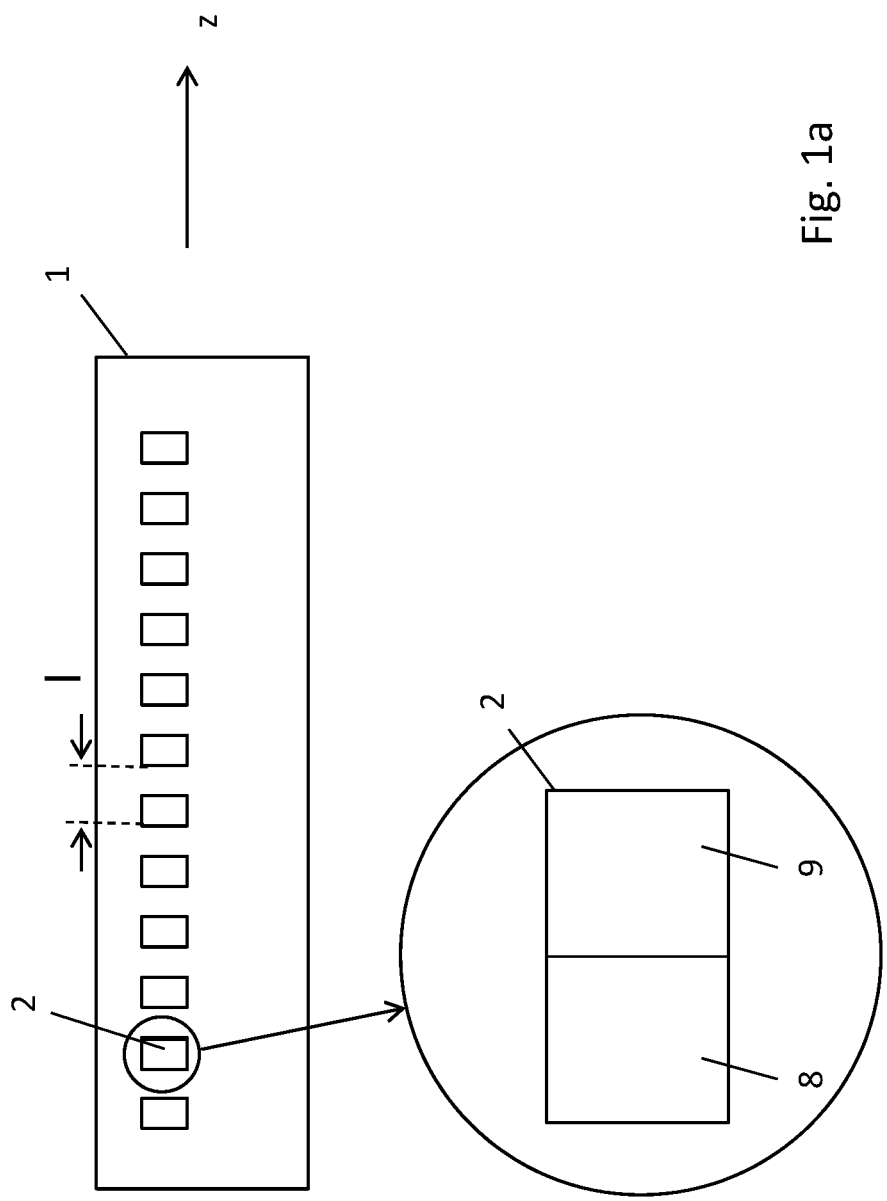
FIG. 1a a first exemplary embodiment of a glass tube semi-finished product for use in a method according to the present invention for manufacturing a hollow glass product.

FIG. 1a shows a first embodiment of a glass tube semi-finished product which, according to the present invention, is used for the manufacture of a hollow glass product from it, as described in more detail below, with an enlarged representation of the markings provided on it. For the production of the glass tube semi-finished product 1, a tube strand marking 2 ("first marking") is continuously applied to the glass tube strand, which includes at least one first piece of information 8. According to the invention, this first piece of information 8 includes information which, either directly or indirectly, i.e. by accessing data of a database or a data carrier, indicates the origin of the glass tube semi-finished product 1, which, in the sense of this application, includes in particular information on the manufacturer, production site and/or production plant of glass tube 1. Generally, these parameters may also be variable, e.g. type of glass, specific production conditions such as sorting settings. These data on the origin of the glass tube semi-finished product 1 may be written in uncoded form in the first information 8, but may also be coded and then cannot be read out in plain text, but can only be read according to a predetermined computation rule or decoding rule. As described below, according to the present invention this first marking can in principle be retained unaltered, even during further processing up to the hollow glass product (e.g. pharmaceutical containers).

According to FIG. 1a, the tube strand markings 2 are applied on the glass tube semi-finished product 1 along the longitudinal direction (z) of the glass tube semi-finished product 1 preferably at predetermined constant intervals (1) from each other. These intervals 1 can, for example, be matched to the envisaged length of those sections from which the hollow glass products (for example pharmaceutical containers) are subsequently to be manufactured and which have to be cut to size from an original glass tube semi-finished product for this purpose, including any wastage or any sections to be cut off.

Expediently the afore-mentioned first marking 2 additionally includes a second piece of information 9 enabling a later traceability of a section of glass tube semi-finished product cut from the glass tube semi-finished product 1 or of the hollow glass product (for example pharmaceutical container) subsequently manufactured therefrom. This second piece of information may in particular be data relating to batch number, tube strand number, a serial number of a glass tube semi-finished product separated from the tube strand, manufacturing time etc.

In addition, the tubing strand marking 2 can include additional information on tube-specific production data, including, in particular, the production parameters for tube forming (for example, glass melt, processing temperatures, the speed at which the glass tube strand is drawn off, the forming agents used, such as the Danner tube or Vello nozzle, as well as their dimensions and characteristics, temperature and process conditions for cooling the glass tube strand after tube forming. Generally, these parameters can also be variable, e. g. type of glass, specific production conditions such as sorting settings.

Information 8, 9 enables the complete supply chain of a glass tube semi-finished product 1 to be traced back, in particular either by directly reading the relevant information from marking 2 or indirectly by accessing an external database or a data carrier, if necessary using the information read from marking 2.

Tube strand markings 2 are preferably applied directly to the still continuous glass tube strand, but can also be applied only after cutting to length and separating glass tube semi-finished products 1 from a glass tube strand. According to the invention, markings 2 are applied without altering the physical and chemical characteristics of the glass tube semi-finished product 1, which can be done by printing a marking or by means of laser marking, for example. At most the physical characteristics are changed locally, but this section or the tube end is later removed during a further processing operation, as described below. The markings 2 can be coded in the usual way, for example in the form of a matrix code or bar codes, but can also display the information in alphanumeric notation.

Figure 1B:
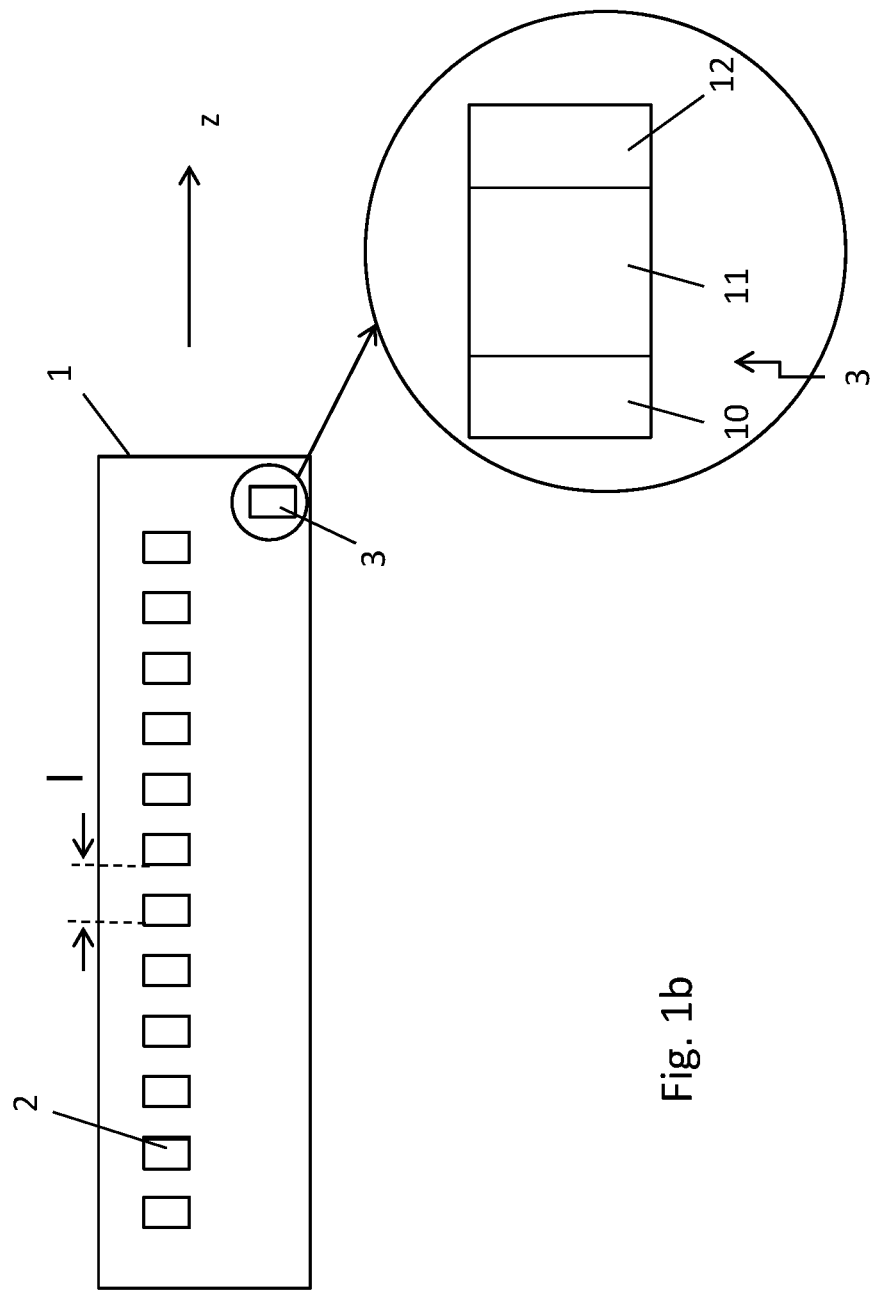
FIG. 1b a second exemplary embodiment of a glass tube semi-finished product for use in a method according to the present invention for manufacturing a hollow glass product.

FIG. 1b shows a second embodiment of a glass tube semi-finished product 1. In addition to the aforementioned tube strand marking 2, at least one second marking 3 is provided at a suitable position on the glass tube semi-finished product 1, for example at a respective beginning or end of a glass tube semi-finished product 1. This second marking 3 includes at least a first information 10 and a second information 11, but may generally include further information 12. According to the present invention, the information 10, 11 together with the tube strand marking 2, if applicable, enable a traceability of the entire supply chain of a glass tube semi-finished product 1. For this purpose, the first information 10 may indicate the origin of the glass tube semi-finished product 1, whereas the second information displays tube-specific production data, as described above.

The additional information 12 can display part of the tube-specific production data which is not absolutely necessary for traceability of the glass tube semi-finished product 1. An example is that this information allows 12 conclusions to be drawn as to which device was used to generate the tube strand marking 2 and/or the second marking 3 on the glass tube semi-finished product 1. This could be, for example, a serial number, type designation, etc. of such a device, which is provided by the original manufacturer of the glass tube semi-finished product 1 or by an authorized device manufacturer. This information can also be certified by an external service provider, such as a testing agency. This information can be readable in plain text, but is preferably readable according to a predetermined calculation rule or decoding rule.

Preferably, also the second marking 3 is applied to the glass tube semi-finished product 1 without altering the physical and chemical characteristics of the glass tube semi-finished product 1, which can be done by printing a marking or by means of laser marking, for example. The marks 2, 3 can be coded in the usual way, for example in the form of a matrix code or bar code, but can also display the information in alphanumeric notation.

Figure 1C:
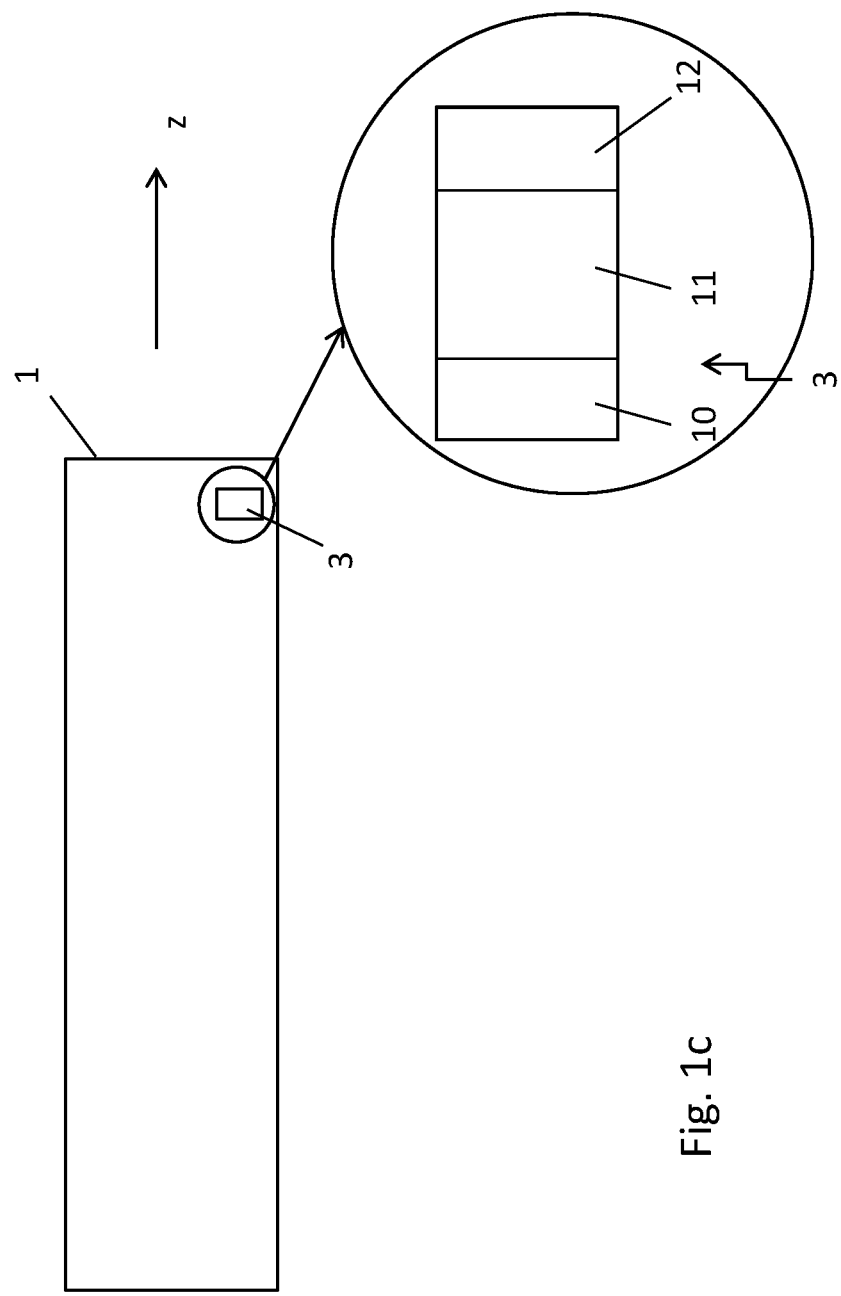
FIG. 1c a third exemplary embodiment of a glass tube semi-finished product for use in a method according to the present invention for manufacturing a hollow glass product.

FIG. 1c shows a third embodiment of a glass tube semi-finished product. As a difference to the previous embodiments, the aforementioned tube strand marking 2 is not provided on the glass tube semi-finished product 1, but all relevant information is contained in the marking 3, which is provided at a suitable position on the glass tube semi-finished product 1, for example at a respective beginning or end of a glass tube semi-finished product 1.

The marking 3 includes at least a first piece of information 10 and a second piece of information 11, but may in principle include additional information 12. According to the present invention, the information 10, 11 enables the entire supply chain of a glass tube semi-finished product 1 to be traced. For this purpose, the first information 10 may indicate the origin of the glass tube semi-finished product 1, whereas the second information 11 indicates tube-specific production data, as described above. The additional information 12 can indicate a part of the tube-specific production data which is not absolutely necessary for traceability of the glass tube semi-finished product 1, as outline above with reference to FIG. 1b.

Preferably, also the second marking 3 is applied to the glass tube semi-finished product 1 without altering the physical and chemical characteristics of the glass tube semi-finished product 1, which can be done by printing a marking or by means of laser marking, for example. The second marking 3 can be coded in the usual way, for example in the form of a matrix code or barcode, but can also display this information in alphanumeric notation.

Figure 2B:
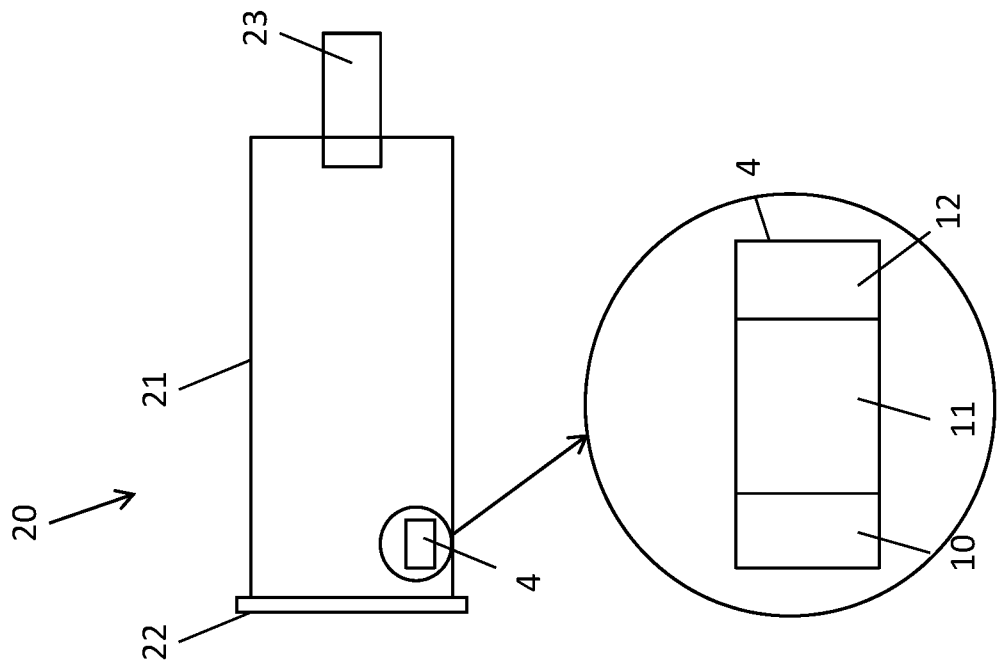
FIG. 2b a second exemplary embodiment of a hollow glass product manufactured from a glass tube semi-finished product according to the present invention with an enlarged view of a marking provided thereon.
Figure 2A:
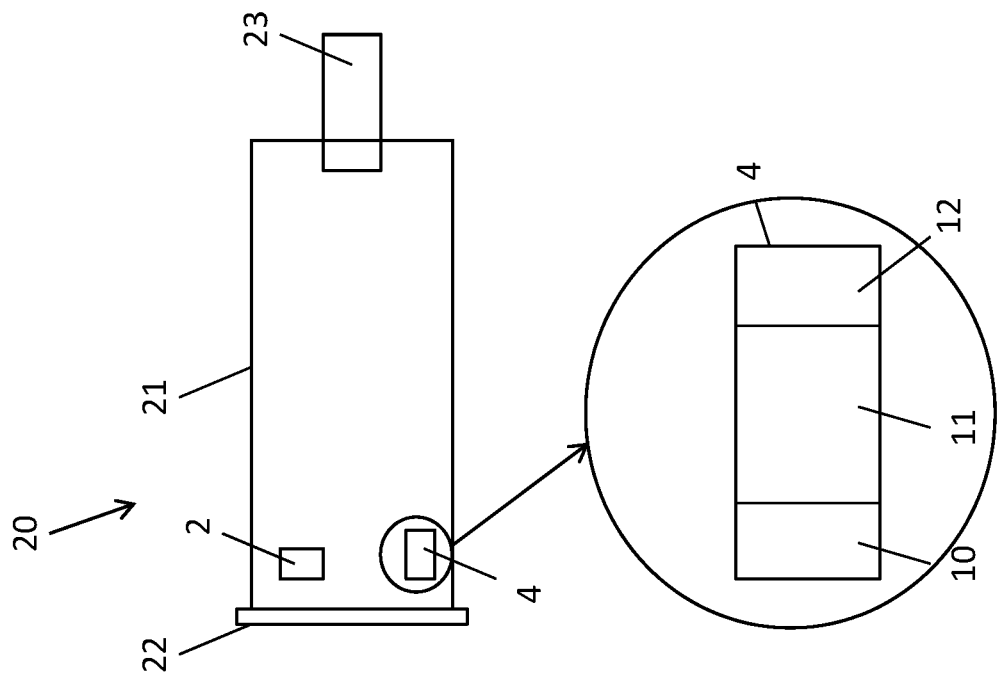
FIG. 2a a first exemplary embodiment of a hollow glass product manufactured from a glass tube semi-finished product according to the present invention with an enlarged view of markings provided thereon.

FIG. 2a shows a first embodiment of a hollow glass product made from a semi-finished glass tube, as described above, with an enlarged representation of the markings provided on it. The hollow-glass product in this embodiment is a pharmaceutical container 20 in the form of a hollow cylindrical syringe body 21 having a flange 22 and an ejection opening 23, although the present invention should not be limited to such hollow-glass products.

According to FIG. 2a, a first marking 2 and a second marking 4 are applied to the syringe body 21, conveniently at positions spaced apart from each other. The first marking 2 is preferably a tube strand marking, as described above with reference to FIGS. 1a-1c. In principle, this first marking 2 may include all the information necessary to enable, either directly or indirectly, a decision to be made on the origin and/or on the tube-specific production data of that glass tube semi-finished product which has been specifically used for the manufacture of the hollow glass product 20, as shown in FIG. 1a above, in order to enable the hollow glass product to be assigned to an initial glass tube used in its manufacture. Generally, when manufacturing the hollow glass product 20 from the glass tube semi-finished product, this marking 2 may remain unaltered on the outer wall of the hollow glass product 20, which presupposes an appropriate control of the manufacturing process, in particular a forming only in areas that are sufficiently far apart from the first marking 2, so that this is not substantially changed.

If the first marking 2 does not include the complete information to enable a decision to be made on the origin and/or the tube-specific production data of the glass tube semi-finished product, according to FIG. 2a a second marking 4 may be applied to the syringe body 21. This second marking 4 may correspond to marking 3 in accordance with FIGS. 1b and 1c, which includes complete information to enable, either directly or indirectly, a decision to be made on the origin and/or tube-specific production data of that semi-finished glass tube that has been used for manufacture of the syringe body 21.

In principle, the second marking 4 may also be applied to the hollow glass product 20 during or after further processing of the glass tube semi-finished product. For this purpose, for example, the information previously available on the glass tube semi-finished product can be read out and the second marking 4 can be applied freshly to the hollow glass product 20. If necessary, additional information may also be written into the second marking 4, for example, on the process parameters that are used during further processing of the glass tube semi-finished product into the hollow glass product 20.

The second marking 4 is preferably applied to the hollow glass product 20 without altering the physical and chemical characteristics of the hollow glass product 20, which can be done by printing a marking or by means of laser marking, for example. The second marking 4 may be coded in the usual way, for example in the form of a matrix code or barcode, but may also display the information in alphanumeric notation.

FIG. 2b shows a second embodiment of a hollow glass product made from a glass tube semi-finished product, as described above, with an enlarged representation of the markings provided on it.

According to FIG. 2b, a marking 4 is applied to syringe body 21. Preferably, the marking 4 is a tube strand marking, as described above with reference to FIG. 1a, which includes all the information necessary to enable, either directly or indirectly, a decision to be made on the origin and/or on the tube-specific production data of that glass tube semi-finished product that has been specifically used for manufacture the syringe body 21, as described above with reference to FIG. 1a, in order to enable the hollow glass product 20 to be assigned to an initial glass tube used for its manufacture. In the manufacture of hollow glass product 20 from the glass tube semi-finished product, generally the marking 2 may remain unaltered on the outer wall of the hollow glass product 20 and be used as marking 4, which presupposes an appropriate control of the manufacturing process, in particular a forming only in areas which are sufficiently far apart from marking 2, so that it is not significantly altered.

In principle, marking 4 may also be applied to the hollow glass product 20 during or after further processing of the glass tube semi-finished product. For this purpose, for example, the information previously available on the glass tube semi-finished product can be read out and the marking 4 can applied freshly to the hollow glass product 20. If necessary, additional information may also be written into the marking 4, e. g. about the process parameters which are used during the further processing of the glass tube semi-finished product into the hollow glass product 20.

Preferably, marking 4 is applied to the hollow glass product 20 without altering the physical and chemical characteristics of the hollow glass product 20, which can be done by printing a marking or by means of laser marking, for example. Marking 4 may be coded in the usual way, for example in the form of a matrix code or bar code, but may also display the information in alphanumeric notation.

Figure 3:
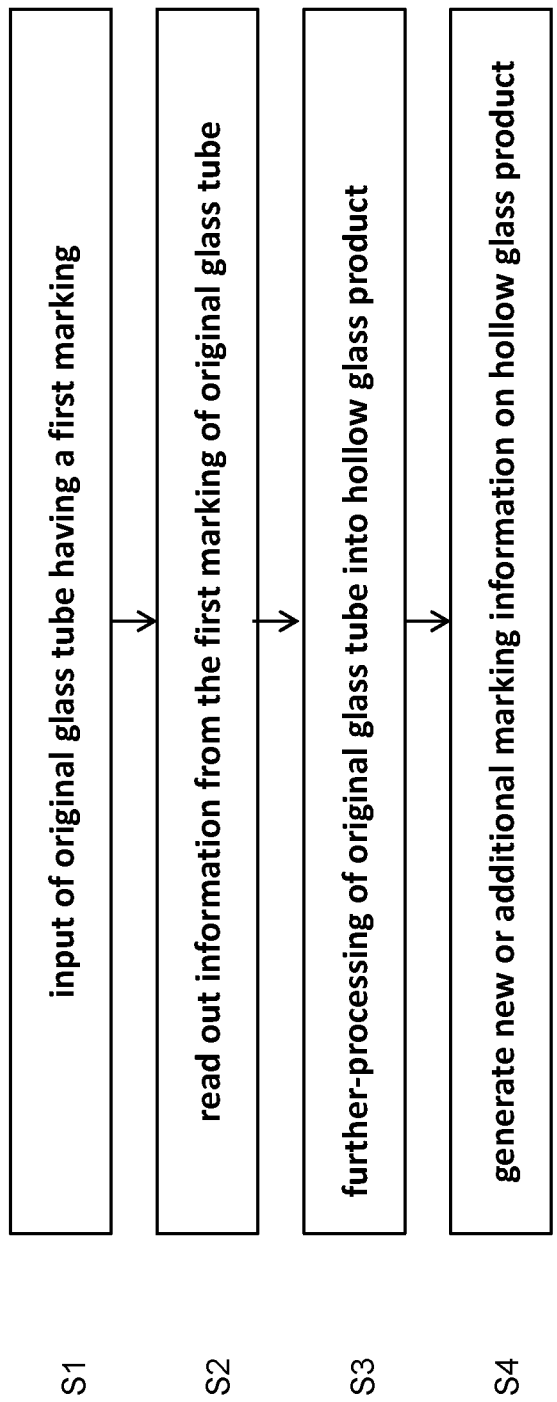
FIG. 3 a schematic flow diagram of a method for manufacturing a hollow glass product according to the present invention that is manufactured by further processing a glass tube semi-finished product including thermal forming of said glass tube semi-finished product, at least in sections.

FIG. 3 shows a schematic flow diagram of a method for manufacturing a hollow glass product according to the present invention that has been manufactured by further processing a glass tube semi-finished product including a thermal forming of said glass tube semi-finished product, at least in sections, in particular at temperatures above the transformation temperature of the glass. For example, the glass tube semi-finished product can be sufficiently heated at one end and then thermally formed in this region. This method is preferably performed by a further-processing company, which obtains original glass tube semi-finished products from an original manufacturer and further processes these into desired hollow glass products. A preferred example of such hollow glass products, which, within the meaning of the present invention, are manufactured from original glass tube semi-finished product, are containers for substances for pharmaceutical, medical or also cosmetic applications.

In step S1, a glass tube semi-finished product is fed into the process for further processing as described above with reference to FIGS. 1a-1c. Here, the original glass tube is provided with at least one marking, in particular a marking as described above with reference to FIG. 1c, which includes all the information necessary to enable a decision to be made on the origin and/or tube-specific production data of the semi-finished glass tube.

The information of the marking(s) is then read in step S2 and is available for further processing. A prerequisite for this is that the further-processing company is aware of all relevant information and specifications, knows how to read the marking(s) from the original glass tube and how to further process it/them, for example for the purpose of decoding or recoding in order to apply a new or additional marking in step S4. For this it is also essentially possible that the relevant facilities at the further-processing company, in particular a device for reading the marking(s) and a device for applying a new or additional marking in step S4, are connected via a network, for example the Internet, preferably via a secure connection with encryption, with a central processor or database of the manufacturer of the original glass tubes.

Generally, the marking on the glass tube semi-finished product may remain unaltered on the hollow glass product during further processing of the original glass tube in step S3 during further processing. During further processing of the original glass tube in step S3 at the further processing company, the marking may also be removed from the glass tube semi-finished product after the relevant information has been read out in advance, for example by separating an end section of the original glass tube with the marking, and replaced by a new marking in step S4. Or the information originally provided on the glass tube semi-finished product is supplemented by additional marking information in step S4. This can also be reported back to the manufacturer of the original glass tube, for example to update a database operated by the manufacturer with relevant information on all glass tubes produced by the manufacturer.

The further processing of the original glass tube semi-finished product may, in particular, include a thermal forming in sections at temperatures above the transformation temperature of the glass. During this process, while the glass is still soft from heating, a new or additional piece of information can be applied to the transformed hollow glass product in step S4, preferably in the form of a Digital Matrix Code (DMC), for example by means of a method such as that disclosed in US 2003 0029849 A1, DE 102 34 002 A1 or WO 2012 028611 A1 of the applicant, the content of which is expressly incorporated herewith by way of reference. The above-mentioned data can thereby be applied as uncoded text or using a predetermined coding.

Of course, in the context of the present invention, provision can be made for the further-processing company to measure and record relevant process parameters during further processing of the original glass tube semi-finished product to form the hollow glass product. This information can be incorporated in the generation of the new or additional marking on the hollow glass product, e.g. by including the relevant process parameters directly in the new or additional marking, or by integrating in the new or additional marking a corresponding link to the associated datasets in a database operated by the further-processing company, to which the original manufacturer of the original glass tubes and the further-processing company have access, but possibly also other parties, such as e.g. certification service providers.

According to the present invention, the at least one marking that is finally provided on the hollow glass product (cf. FIGS. 2a and 2b) is in each case configured such as to enable, either directly or indirectly, a decision to be made on the origin and/or on the tube-specific production data of the glass tube semi-finished product used for the manufacture of the hollow glass product. In this way, according to the present invention the supply chain can be traced back completely from the initial glass tube up to the hollow glass product, including relevant original information on the glass tube semi-finished product, production data from suppliers of the glass tube semi-finished product, production parameters, tube manufacturing data, sorting settings, etc.

In other words: according to the invention, a complete family tree of the relevant data is possible from the original glass tube or the corresponding section of it up to the hollow glass product, so that not only a traceability is possible, but for the purpose of a quality control and optimization of logistics and further processing steps also a complete traceability to all relevant parameters of the original glass tube or the corresponding section of it is possible. For example, the continuous tube strand can be marked with all relevant original parameters (manufacturer, serial number, glass melt, tube tension . . . ) during tube forming.

By means of the coding or marking of the hollow glass product at the further processing company a complete traceability to all relevant parameters of the original glass tube or of the corresponding section of it is also possible on the hollow glass product, e.g. on the consumer's side.

This means that important information is also available at a later date for complaints or damage analyses.

Figure 4:
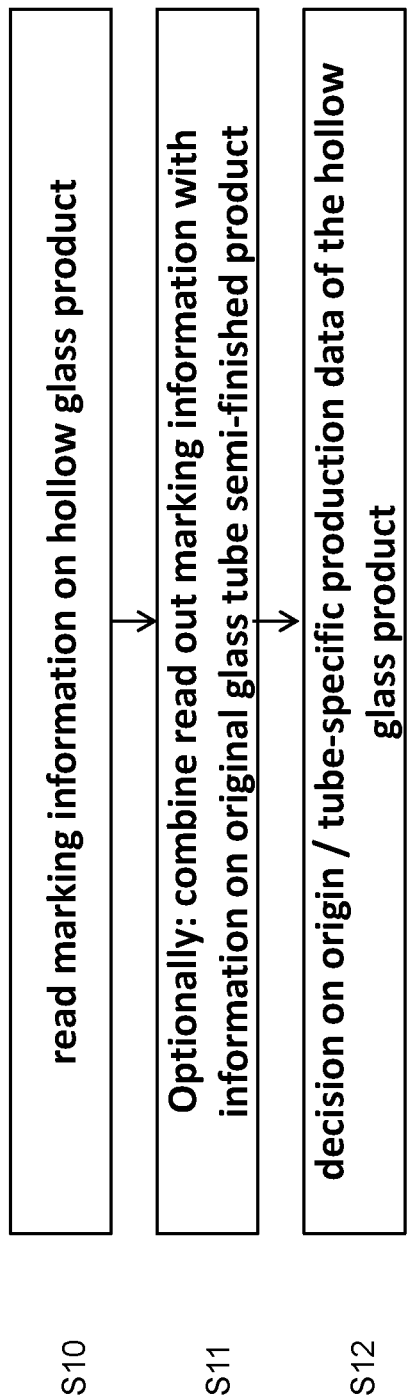
FIG. 4 a schematic flow diagram of a method for back-tracking a hollow glass product according to the present invention that is manufactured by further processing a glass tube semi-finished product including thermal forming of said glass tube semi-finished product performed at least in sections.

FIG. 4 shows a schematic flow diagram of a method for backtracking a hollow glass product according to the present invention that has been manufactured by further processing a glass tube semi-finished product including thermal forming of said glass tube semi-finished product performed at least in sections. This method can be executed in particular by a consumer but also for the purposes of quality control and quality assurance. To do this, in step S10, information is read from the at least one marking on the hollow glass product (cf. FIGS. 2a and 2b). Optionally, in step S11, this captured information is linked with further information about the original glass tube, in order to allow, on the basis of the link in step S12, a decision to be made about an origin and/or about the tube-specific production data of the glass tube semi-finished product from which the hollow glass product has been manufactured. For this purpose, access may be provided to a database that is operated by the manufacturer of the original glass tube and/or by the further-processing company. This access can be via a network, for example a company network or the Internet, wherein secure connections including an encryption are preferably used.

Figure 5:
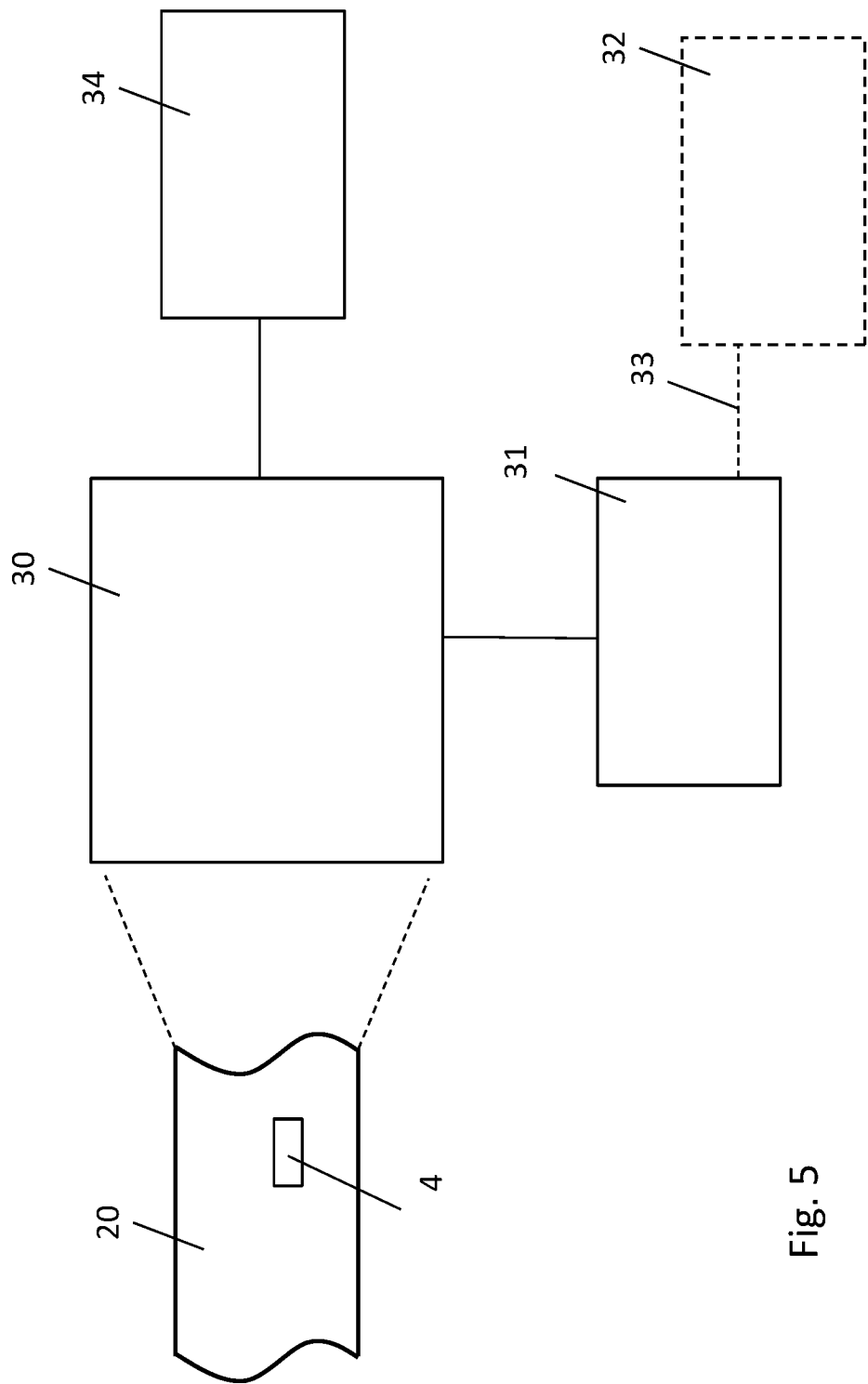
FIG. 5 a schematic diagram of an apparatus for back-tracking a hollow glass product according to the present invention that is manufactured by further processing a glass tube semi-finished product including thermal forming of said glass tube semi-finished product performed at least in sections.

FIG. 5 shows a schematic diagram of a device for backtracking a hollow glass product according to the present invention that has been manufactured by further processing a glass tube semi-finished product including a thermal forming of said glass tube semi-finished product performed at least in sections. According to FIG. 5, a detection device 30, which reads at least one marking 3 on the hollow glass product (cf. FIGS. 2a and 2b) is provided. In the case of a Digital Matrix Code (DMC), optical reading methods can be employed for this purpose, such as the method disclosed in US 2003 0029849 A1, DE 102 34 002 A1 or WO 2012 028611 A1 of the applicant. Even if the at least one marking has been printed on the hollow glass product or applied by means of a laser marking, the at least one marking on the hollow glass product can be read out by means of an optical reading procedure. This can be performed under the control of a control device 34, particularly of a processor. For this purpose, there may be an access to an internal database 31, in which relevant data are stored, which allows a tracking of the hollow glass product 20 back to the glass tube semi-finished product, from which the hollow glass product 20 was manufactured. These relevant data may also be stored in an external database 32, which is operated, for example, by an original manufacturer of glass tubes or by a certified further-processing company. The access to this external database 32 can be via a network, for example a company network or the Internet, wherein secure connections including an encryption are preferred.

Of course, the control may also take place via a control device 34, which is operated by an original manufacturer of glass tubes or by a certified further-processing company. To this end, data communication can take place via a network, for example a company network or the Internet, wherein secure connections, including an encryption, are preferred.

Figure 6A:
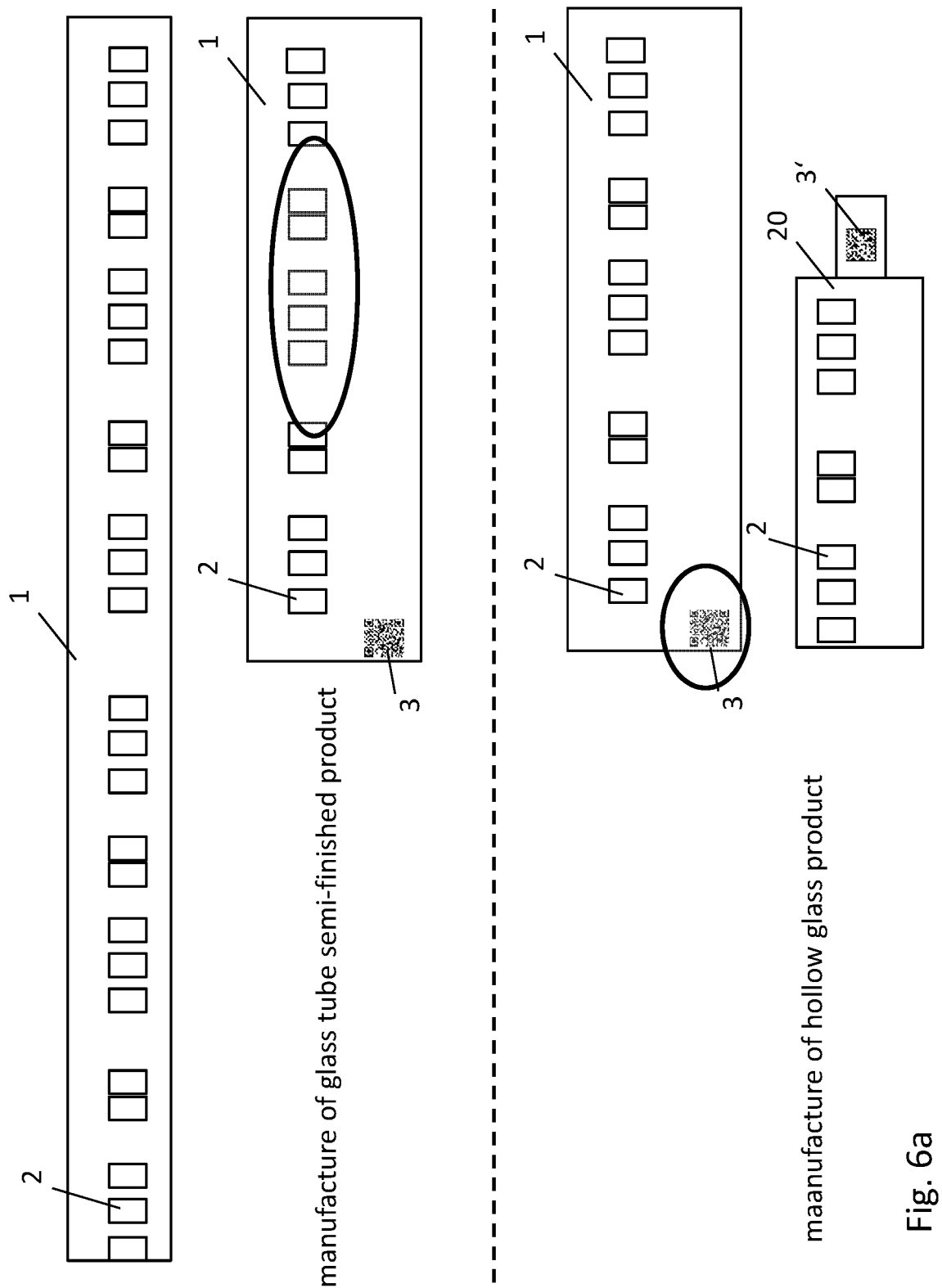
FIG. 6a schematically summarizes the markings provided on a glass tube semi-finished product at various stages of further processing.

FIG. 6a schematically summarizes the markings provided on the glass tube semi-finished product in various stages of further processing of the glass tube semi-finished product. The top part first of all shows a continuous tube strand 1 directly after tube forming. Glass tube semi-finished products 1 are cut to a predetermined length from this tube strand 1 by the glass tube manufacturer, for example a length of 1.5 m. Glass tube semi-finished products 1 are each linked with information on origin or on origin and tube-specific production data, as shown in FIG. 6a exemplified by marking 2, which may be, e.g., serial numbers '7808', '7809'. As is further shown in FIG. 6a, during cutting to length of the glass tube semi-finished product 1, a first marking 3 is generated at a predetermined position of the respective glass tube semi-finished product 1, for example at a back end. The information of this first marking 3 is linked in a suitable manner to the information about the origin of the glass tube semi-finished product 1 and about tube-specific data. The relevant data during manufacture of the glass tube semi-finished product 1 are also stored in a database of the glass tube manufacturer in one-to-one correlation with the respective glass tube semi-finished product 1. An authorized further-processing company and/or a filling company may access this database.

The bottom part of FIG. 6a shows the steps performed by a further-processing company. The glass tube semi-finished product 1 is first of all taken out of a transport packaging. During this process the pieces of information are read out from the first marking 3 and further processed. The glass tube semi-finished product 1 is then further processed, namely according to FIG. 6a in order to form a hollow glass product 20, for example a syringe body, vial or the like. As shown in FIG. 6a, after it has been read, the first marking 3 is removed during further processing of the glass tube semi-finished product 1, for example by cutting the section bearing the additional marking off the glass tube semi-finished product. The information read from the first marking 3 is used to generate a new marking 3' ('additional marking'), which is linked in the manner described above to the information of the first marking 3, so as to allow a decision to be made about an origin or about an origin and tube-specific data of the original glass tube semi-finished product 1.

FIG. 6b shows a schematic flow diagram of the various stages of the further processing of a glass tube semi-finished product into a pharmaceutical packaging material and its further processing. First of all, individual glass tube semi-finished products are cut to length and separated from the continuous glass tube strand in S21 step by the manufacturer of the glass tube semi-finished products. A first marking is created, for example a consecutive number (7809'). Further information may also be encoded into the first marking, which is indicated by the optional step S22 (e.g. information on the length of the respective glass tube semi-finished product, the axial run-out during tube forming, etc.). This additional information may also be encoded in the first marking.

Following step S22 and further packaging, the glass tube semi-finished products are delivered to a further processing company (step S23). After unpacking the glass tube semi-finished product, this further processing company reads the first marking on the glass tube semi-finished product (step S24). Then, in step S25, a query to the database of the manufacturer of the glass tube semi-finished product can be made, making available the complete information associated with the first marking. For example, the first marking may only include a sequential number, based on which the complete information becomes available by means of a query to the database of the manufacturer of the glass tube semi-finished product. The glass tube semi-finished product is then further processed into a hollow glass product (step S26). Here, the first marking is removed after reading the information. Subsequently, a new marking ('additional marking') is applied to the hollow glass product, as described above with reference to FIG. 6a. The information of the new marking is linked to the information of the first marking in the manner described above to enable a decision to be made on the origin or on the origin and tube-specific production data of the original glass tube semi-finished product 1. Furthermore, the new marking may also include production data and production parameters during the manufacture of the hollow glass product at the further processing company, such as process parameters for the thermal forming of the glass tube semi-finished product into the hollow glass product, which is carried out at least in sections. In step S27, this additional information is also stored in a database, which may also be the database of the manufacturer of the glass tube semi-finished product.

After step S27, the hollow glass products are delivered to a pharmaceutical company where these are filled. For this purpose, the new marking on the hollow glassware product is first read on the side of the pharmaceutical company (step S28) in order to enable a decision to be made on the origin or on the origin and tube-specific production data of the original glass tube semi-finished product 1 (step S29). Using the new (additional) marking, further useful information may be identified and forwarded to the pharmaceutical company. This information may relate in particular to information obtained during further processing of the glass tube semi-finished product into the hollow glass product, such as geometric sizes of the hollow glass product, such as inner diameter, outer diameter, wall thickness, lengths, variations of these sizes, etc. These parameters may be used by the pharmaceutical company to control the filling of the hollow glass products.

LIST OF REFERENCE NUMERALS

1 glass tube or glass tube semi-finished product
2 tube strand marking
3 marking
3' marking
4 marking
8 first piece of information
9 second piece of information
10 first section
11 second section
12 third section
20 glass tube semi-finished product/hollow glass product/pharmaceutical container
21 syringe body
22 flange
23 ejection opening
30 detection device
31 internal database
32 external database
33 network
34 processor device/control device
l predetermined interval
Z longitudinal direction

What is claimed is:

1. A method for manufacturing a hollow glass product from a glass tube semi-finished product, the method comprising the steps of:
   marking the glass tube semi-finished product on a surface thereof with a plurality of markings, wherein each of the plurality of markings is applied without altering the physical and chemical characteristics of an inner surface of the glass tube semi-finished product; and
   further processing the glass tube semi-finished product, wherein the further processing includes a thermal forming of the glass tube semi-finished product, at least in sections, into the hollow glass product at temperatures above the transformation temperature of the glass tube semi-finished product;
   wherein each of the plurality of markings is marked at constant intervals that correspond to a length of the hollow glass product,
   wherein each of the plurality of markings are marked during a separation of the glass tube semi-finished product from a glass tube strand,
   wherein each of the plurality of markings is readable on the hollow glass product after its manufacture,
   wherein each of the plurality of markings comprises information regarding tube-specific production data of the glass tube semi-finished product, and
   wherein the tube-specific production data comprises at least one parameter selected from the group consisting of: a glass melt, a processing temperature, a speed at which the glass tube semi-finished product is drawn off, a forming agent used, dimensions and characteristics of the forming agent used, a temperature and process conditions for cooling the glass tube semi-finished product after tube forming, and specific production conditions.

2. The method according to claim 1, wherein the plurality of markings are made at uniform distances from each other in a longitudinal direction of the glass tube semi-finished product during a tube shaping of the glass tube semi-finished product.

3. The method according to claim 1, wherein each of the plurality of markings is marked at a predetermined position on the glass tube semi-finished product.

4. The method according to claim 3, further comprising an additional marking, wherein the additional marking is produced at temperatures above the transformation temperature of the glass of the glass tube semi-finished product.

5. The method according to claim 1, wherein the plurality of markings are marked with one of (i) a printing device or (ii) a laser.

6. The method according to claim 1, further comprising:
reading out the information from the marking on the hollow glass product; and
backtracking the hollow glass product by determining at least one of the origin and the tube-specific production data of the glass tube semi-finished product based on the information read from the marking.

7. The method according to claim 6, wherein each of the plurality of markings further comprises information on process parameters for the further processing of the glass tube semi-finished product into the hollow glass product, the method further comprising:
determining the process parameters for the further processing of the glass tube semi-finished product into the hollow glass product on the basis of the information read from the marking.

8. The method according to claim 7, wherein the determining the process parameters for the further processing of the glass tube semi-finished product into the hollow glass product comprises accessing a database via a network, said database storing further information regarding the process parameters.

9. The method according to claim 6, wherein the determining at least one of the origin and the tube-specific production data of the glass tube semi-finished product comprises accessing a database via a network, said database storing further information regarding at least one of the origin and the tube-specific production data.

10. A method for manufacturing a hollow glass product from a glass tube semi-finished product, the method comprising the steps of:
marking the glass tube semi-finished product on a surface thereof with a first marking, wherein the first marking is applied without altering the physical and chemical characteristics of an inner surface of the glass tube semi-finished product;
further processing of the glass tube semi-finished product, wherein the further processing includes a thermal forming of the glass tube semi-finished product, at least in sections, into the hollow glass product at temperatures above the transformation temperature of the glass tube semi-finished product;
wherein the first marking is marked at predetermined intervals that are matched to subsequent further processing steps for the glass tube semi-finished product,
wherein the first marking includes information regarding at least one of an origin and tube-specific production data of the glass tube semi-finished product,
wherein the method further comprises the steps of removing the first marking during the further processing step; and,
marking a second marking on the hollow glass product, wherein the second marking includes the information of the first marking regarding at least one of the origin and the tube-specific production data of the glass tube semi-finished product, and
wherein the second marking is configured to be read from the manufactured hollow glass product subsequent to its manufacture in order to enable a determination regarding at least one of the origin and the tube-specific production data of the glass tube semi-finished product used for the manufacture of the hollow glass product.

11. The method according to claim 10, wherein the first marking is a plurality of markings that are marked at predetermined distances from each other in a longitudinal direction of the glass tube semi-finished product during a tube shaping of the glass tube semi-finished product.

12. The method according to claim 11, wherein the second marking is a plurality of second markings, and wherein one of the plurality of first markings or plurality of second markings is marked at a predetermined position on the glass tube semi-finished product.

13. The method according to claim 12, wherein the second plurality of markings are produced at temperatures above the transformation temperature of the glass of the glass tube semi-finished product.

14. The method according to claim 10, wherein the first marking is marked during a separation of the glass tube semi-finished product from a glass tube strand.

15. The method according to claim 10, wherein the first marking is marked with (i) a printing device or (ii) a laser.

16. A non-transitory, computer-readable medium storing a computer program having program codes which, when executed by a processor device, cause the processor device to control a method comprising:
marking the glass tube semi-finished product with a plurality of markings, wherein each of the plurality of markings is applied without altering the physical and chemical characteristics of an inner surface of the glass tube semi-finished product; and
further processing of the glass tube semi-finished product, wherein the further processing includes a thermal forming of the glass tube semi-finished product, at least in sections, into a hollow glass product at temperatures above the transformation temperature of the glass tube semi-finished product;
wherein each of the plurality of markings is marked at constant intervals that correspond to a length of the hollow glass product,
wherein each of the plurality of markings are marked during a separation of the glass tube semi-finished product from a glass tube strand,
wherein each of the plurality of markings is legible on the hollow glass product after its manufacture in order to enable a determination regarding the tube-specific production data of the glass tube semi-finished product,
wherein each marking comprises information regarding tube-specific production data of the glass tube semi-finished product, and wherein the tube-specific production data comprises at least one parameter selected from the group consisting of: a glass melt, a processing temperature, a speed at which the glass tube semi-finished product is drawn off, a forming agent used, dimensions and characteristics of the forming agent used, a temperature and process conditions for cooling the glass tube semi-finished product after tube forming, and specific production conditions.

\* \* \* \* \*